US008863582B2

(12) United States Patent
Kurtz et al.

(10) Patent No.: US 8,863,582 B2
(45) Date of Patent: Oct. 21, 2014

(54) METHOD OF JOINING A PRESSURE SENSOR HEADER WITH AN ASSOCIATED TRANSDUCER ELEMENT

(71) Applicant: Nora Kurtz, Saddle River, NJ (US)

(72) Inventors: Anthony D. Kurtz, Saddle River, NJ (US); Adam Kane, Morristown, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

(21) Appl. No.: 13/967,287

(22) Filed: Aug. 14, 2013

(65) Prior Publication Data
US 2013/0327150 A1 Dec. 12, 2013

Related U.S. Application Data

(60) Continuation of application No. 13/352,117, filed on Jan. 17, 2012, now abandoned, which is a continuation-in-part of application No. 11/978,291, filed on Oct. 29, 2007, now Pat. No. 8,136,407, which is a division of application No. 11/036,877, filed on Jan. 14, 2005, now Pat. No. 7,369,032, which is a continuation-in-part of application No. 10/867,029, filed on Jun. 14, 2004, now Pat. No. 7,212,096, which is a continuation-in-part of application No. 10/339,725, filed on Jan. 9, 2003, now abandoned.

(51) Int. Cl.
G01L 19/00 (2006.01)
H01C 10/10 (2006.01)
B23K 15/04 (2006.01)
B23K 26/18 (2006.01)
B23K 26/28 (2014.01)

(52) U.S. Cl.
CPC .............. *G01L 19/00* (2013.01); *B23K 15/04* (2013.01); *B23K 26/18* (2013.01); *B23K 2201/12* (2013.01); *B23K 26/28* (2013.01); *B23K 2201/38* (2013.01); *G01L 19/0007* (2013.01)
USPC .............................................. 73/756; 338/36

(58) Field of Classification Search
USPC .................................................. 73/700–756
See application file for complete search history.

(56) References Cited

U.S. PATENT DOCUMENTS

| | | | | | |
|---|---|---|---|---|---|
| 3,924,322 | A | * | 12/1975 | Kurtz et al. | 438/51 |
| 5,174,014 | A | * | 12/1992 | Erichsen et al. | 29/621.1 |
| 5,317,923 | A | * | 6/1994 | Erichsen et al. | 73/727 |
| 7,212,096 | B2 | * | 5/2007 | Kurtz et al. | 338/42 |
| 7,369,032 | B2 | * | 5/2008 | Kurtz et al. | 338/36 |
| 7,432,795 | B2 | * | 10/2008 | Kurtz et al. | 338/36 |
| 8,136,407 | B2 | * | 3/2012 | Kurtz et al. | 73/756 |
| 2013/0327150 | A1 | * | 12/2013 | Kurtz et al. | 73/756 |

* cited by examiner

*Primary Examiner* — Andre Allen
(74) *Attorney, Agent, or Firm* — Troutman Sanders LLP; James E. Schutz; Mark Lehi Jones

(57) ABSTRACT

A pressure transducer assembly including: a pressure sensor header; a transducer assembly member; and a joining arrangement disposed at an interface of the header and the transducer assembly member, for joining the header with the transducer assembly member, the joining arrangement including: a recessed female joining element formed in one of the header and the transducer assembly member; and a protruding male joining element formed on the other of the header and the transducer assembly member, the male joining element received in the female joining element.

20 Claims, 6 Drawing Sheets

METHOD OF JOINING A PRESSURE SENSOR HEADER WITH AN ASSOCIATED TRANSDUCER ELEMENT

CROSS-REFERENCE TO RELATED APPLICATIONS

This application is a continuation application of U.S. patent application Ser. No. 13/352,117, filed Jan. 17, 2012, which is a continuation in part application of U.S. patent application Ser. No. 11/978,291, filed Oct. 29, 2007, now U.S. Pat. No. 8,136,407, entitled METHOD OF JOINING A PRESSURE SENSOR HEADER WITH AN ASSOCIATED TRANSDUCER ELEMENT, which is a divisional of U.S. patent application Ser. No. 11/036,877, filed Jan. 14, 2005, now U.S. Pat. No. 7,369,032, entitled METHOD OF JOINING A PRESSURE SENSOR HEADER WITH AN ASSOCIATED TRANSDUCER ELEMENT, which is a continuation-in-part application of U.S. patent application Ser. No. 10/867,029, filed Jun. 14, 2004, now U.S. Pat. No. 7,212,096, entitled PRESSURE SENSOR HEADER HAVING AN INTEGRATED ISOLATION DIAPHRAGM, which is a continuation-in-part of U.S. patent application Ser. No. 10/339,725, filed Jan. 9, 2003, entitled PRESSURE SENSOR HEADER HAVING AN INTEGRATED ISOLATION DIAPHRAGM, the entire disclosures of which are hereby incorporated by reference as if being set forth in their respective entireties herein.

FIELD OF THE INVENTION

The present invention relates to pressure transducers, and more particularly to an improved method of joining a pressure sensor header with an associated port or other transducer element.

BACKGROUND OF THE INVENTION

Pressure transducers conventionally include pressure sensor headers. U.S. Pat. No. 4,695,817 entitled, ENVIRONMENTALLY PROTECTED PRESSURE TRANSDUCERS EMPLOYING TWO ELECTRICALLY INTERCONNECTED TRANSDUCER ARRAYS issued to A. D. Kurtz et al. on Sep. 22, 1987 and assigned to the assignee herein, the entire disclosure of which is hereby incorporated by reference herein, provides an example. Certain pressure sensor headers include a metal header shell having a front face with straight or tapered holes and header pins extending therethrough. Well known fused glass-metal seals sit in the holes and seal the header pins to the front face of the header shell. Pressure sensor headers commonly operate under external pressures, for example hydrostatic pressures, which can reach extremes, depending on the sensor application, up to and in excess of 50,000 psi.

Referring now to FIG. 1A, there is shown a graphical representation of an operation of a pressure sensor header 10 under a hydrostatic pressure that exposes a front face 12 of a metal header shell 11, as well as the cylindrical side wall 14 of the header shell 11, to pressure forces. The pressure force N acting on the header shell's cylindrical side wall 14 generates compressive tangential and radial stresses (hoop stress) in the side wall 14. The pressure force F acting on the front face 12 of the header 10 pushes on the glass seals 16 and header pins 18. An excessive amount of pressure force F on the front face 12 of the header 10 can push the pins 18 or glass seals 16 into the header 10, breaking the glass-metal seals 17 and allowing leakage. The compressive hoop stress generated in the side wall 14 of the header shell 11 compresses or constricts the seals 16 around the pins 18 thereby strengthening them. Under even greater hydrostatic pressures, the compressive hoop stress assists in retaining the seals 16 or preventing leaks, than if the side wall 14 of the header shell 11 were not exposed to any hydrostatic pressure.

Referring now also to FIG. 1B, the pressure force N acting on the side wall of the header shell functions similarly to the frictional forces between the glass seals 16 and the walls 19 of the header pin apertures 15. The frictional forces resist the motion, or pushing out, of the glass seals 16 from the pin apertures 15.

The pressure sensor header is ordinarily welded to a port or other transducer element using a weld area that is typically modeled as a thick wall cylinder. To survive these high stresses under pressure, such a weld area requires the use of a deep, penetrating butt joint weld. Such deep welding processes usually produce localized heat in the header material, which may stress or crack the glass header seals, pins and other header components. Typical design strategies for avoiding such problems involve moving the pins and other components away from the zone affected by the welding heat. Such designs often involve making the header larger, or longer in length.

However, these conventional pressure sensor header to port joining methods still present various problems. The extreme external pressures tend to fatigue and fracture the welded joints at the header-port interfaces. Additionally, as described above, the weld heat during the joining process tends to heat and damage the glass seals. The provision of larger or longer headers to avoid such weld damage may result in more costly, heavier or less accurate pressure headers.

Thus, an improved method of joining the pressure sensor header with a port or other transducer element is desired, which provides a higher strength device that can operate under extreme applied pressures, while also avoiding damage to header components during the joining process.

SUMMARY OF THE INVENTION

A pressure transducer assembly including: a pressure sensor header; a transducer assembly member; and a joining arrangement disposed at an interface of the header and the transducer assembly member, for joining the header with the transducer assembly member, the joining arrangement including: a recessed female joining element formed in one of the header and the transducer assembly member; and a protruding male joining element formed on the other of the header and the transducer assembly member, the male joining element received in the female joining element.

BRIEF DESCRIPTION OF THE DRAWINGS

Understanding of the present invention will be facilitated by consideration of the following detailed description of the preferred embodiments of the present invention taken in conjunction with the accompanying drawings, wherein like numerals refer to like parts and.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, many other elements found in typical pressure transducer headers and manufacture methods relating thereto. Those of ordinary skill in the art will recognize that other elements are desirable and/or required in order to implement the present invention. However, because such elements are well known in the art, and because they do not facilitate a better understanding of the present invention, a discussion of such elements is not provided herein. The disclosure herein is directed to all such variations and modifications to such elements and methods known to those skilled in the art.

Figure 1A:
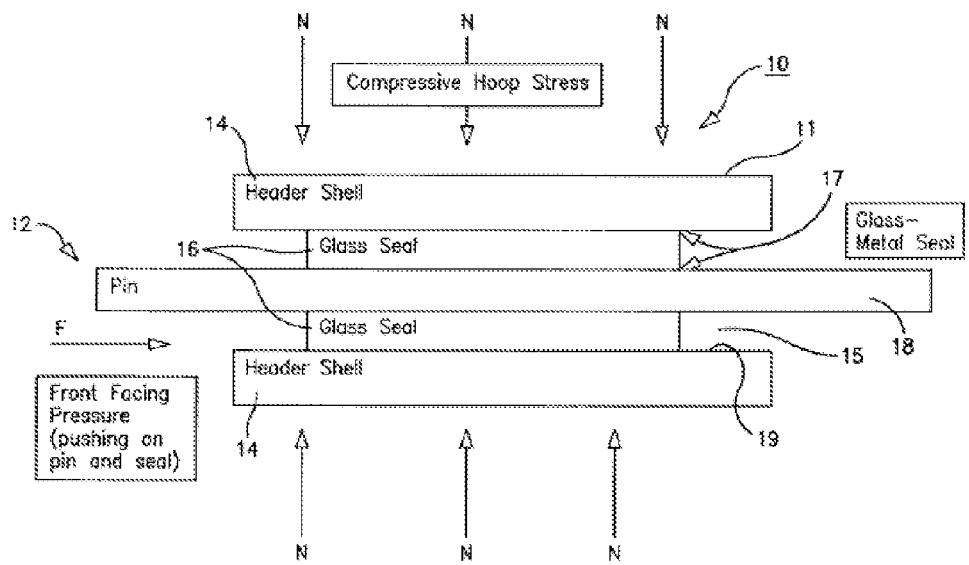
FIGS. 1A and 1B are sectional views through a conventional header under hydrostatic pressure.
Figure 1B:
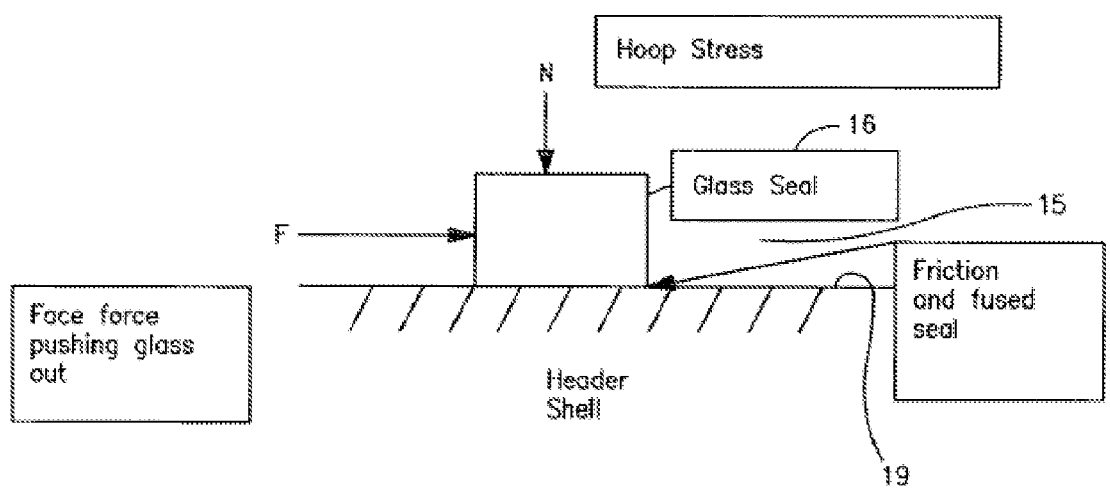
Figure 2:
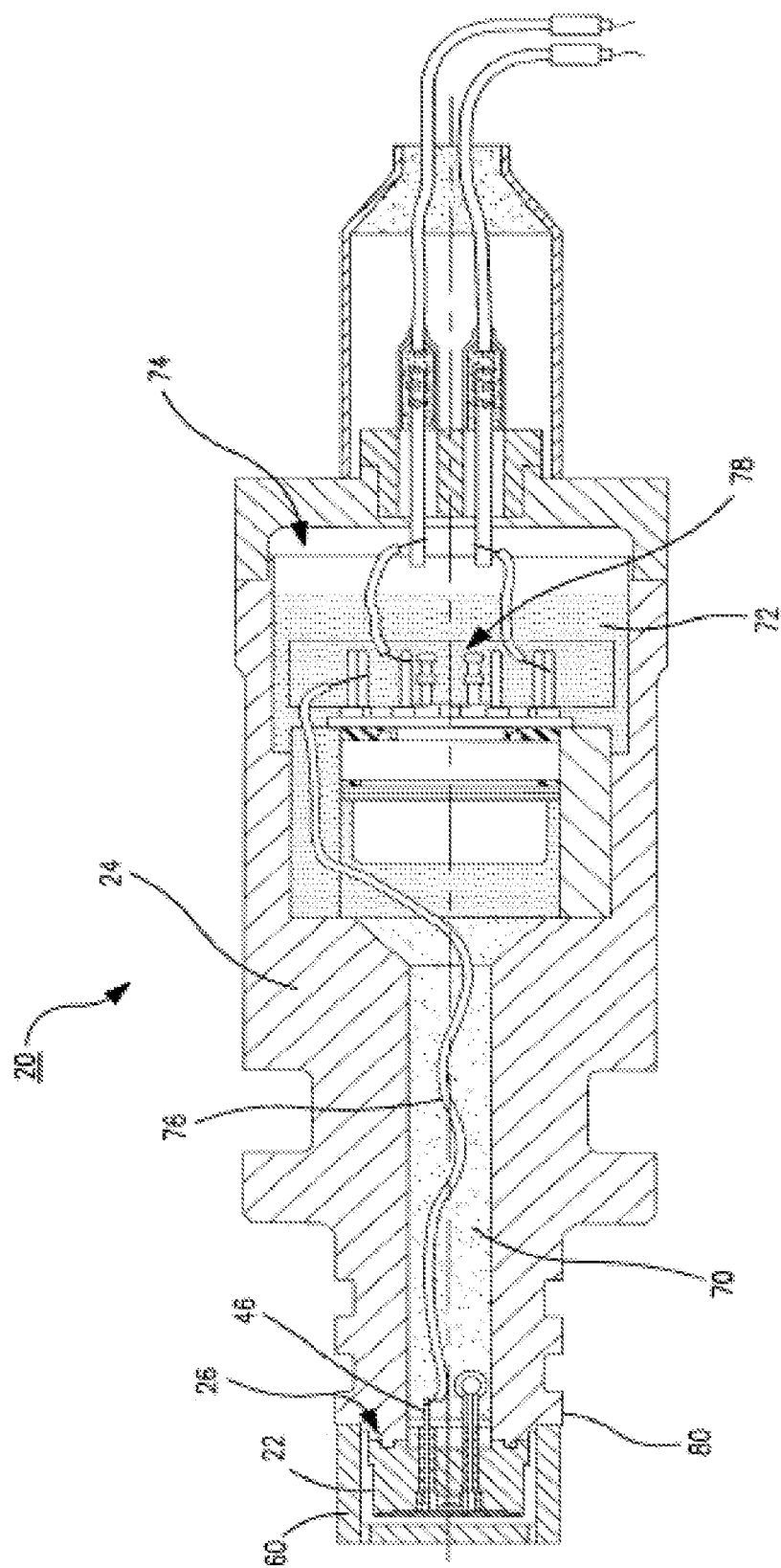
FIG. 2 is a sectional view of a pressure transducer assembly utilizing the invention.

Referring now to FIG. 2, there is shown an illustrative embodiment of a pressure transducer assembly 20 according to an aspect of the present invention. The pressure transducer assembly 20 includes a pressure sensor header 22 joined, in accordance with the principles of the present invention, with another transducer element or member 24, such as a sensor body or port, at an interface 26 of the header 22 and the other transducer element 24.

Figure 3:
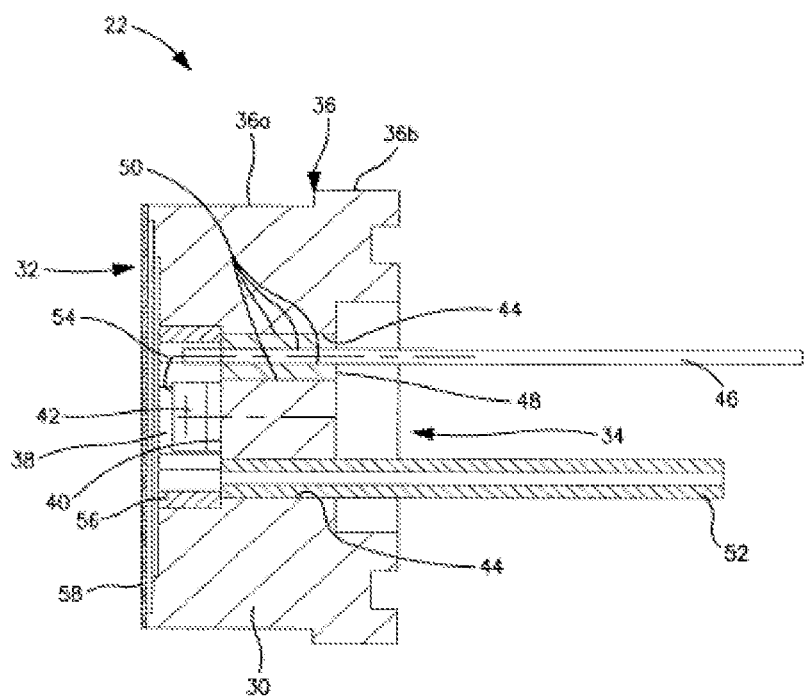
FIG. 3 is a sectional view of a pressure sensor header of the pressure transducer assembly of FIG. 2.

Referring now also to FIG. 3, the pressure sensor header 22 includes a body or shell 30, which is typically made from metal or metal alloy. The shell 30 has a front end 32, an opposing back end 34, and a side wall 36 that may be formed in a stepped configuration with a first cylindrical surface portion 36a of a first diameter, and a second cylindrical surface portion 36b of a second diameter. A sensor cavity 38 is formed in the front end 32 of the shell 30. The sensor cavity 38 contains a sensor element 42, which may be centrally mounted on the floor 40 of the sensor cavity 38. A plurality of cylindrical apertures 44 are defined in the floor 40 of the sensor cavity 38. The apertures 44 extend through the shell 30 to the back end 34 thereof. A number of the apertures 44 have a fused, glass seal or bead 48 seated therein, which surrounds a pin 46. The pins 46 (only one is visible) are typically constructed of a gold-plated, glass sealing alloy, such as Kovar. The fused glass beads 48 hermetically seal the pins 46 to the shell 30. The glass-metal seals 50 formed by the shell 30 and each pin 46 and fused glass bead 48, prevent pressure medium (not shown) leakage from the front end 32 of the shell 30 to the back end 34 of the shell 30. The fused, glass beads 48 also dielectrically insulate the pins 46 from the shell 30. A tube 52 is disposed in one of the apertures 44. The tube 52 allows the sensor cavity 38 to be filled with a suitable fluid medium, such as silicone oil, after which the tube 52 may be sealed by welding or other conventional sealing means.

Referring still to FIG. 3, sensor element 42 electrically communicates through gold bonded wires 54 (only one is visible) with the header pins 46. A ceramic insert 56 is disposed in the sensor cavity 38 and surrounds the pins 46 and the sensor element 42. The ceramic insert 56 provides a wire path for the wires 54 and minimizes the required volume of oil within the sensor cavity 38. An isolation diaphragm 58 is mounted on the front end 32 of the shell 30, over the sensor cavity 38. The isolation diaphragm 58 forms a header face or front face.

Referring again to FIG. 2, port 24 may be formed as a generally cylindrical, tube-like member defining a conduit 70 that communicates with an internal port cavity 72 formed at an end 74 opposite the header-port interface 26. The port cavity 72 mechanically houses, protects, and electrically shields compensation or amplifier electronics. Signal wires 76 connected to the header pins 46 pass through the conduit 70 to electrically communicate with either a sensor cable or the electronics 78 located within the cavity 72. A cap-like screen element 60 is mounted on an outer flange 80 of the port 24, adjacent the header-port interface 26.

The screen element 60 surrounds the header 22, thus, providing mechanical protection for the header 22, while allowing the pressure medium to pass through it and contact the header 22.

Figure 4:
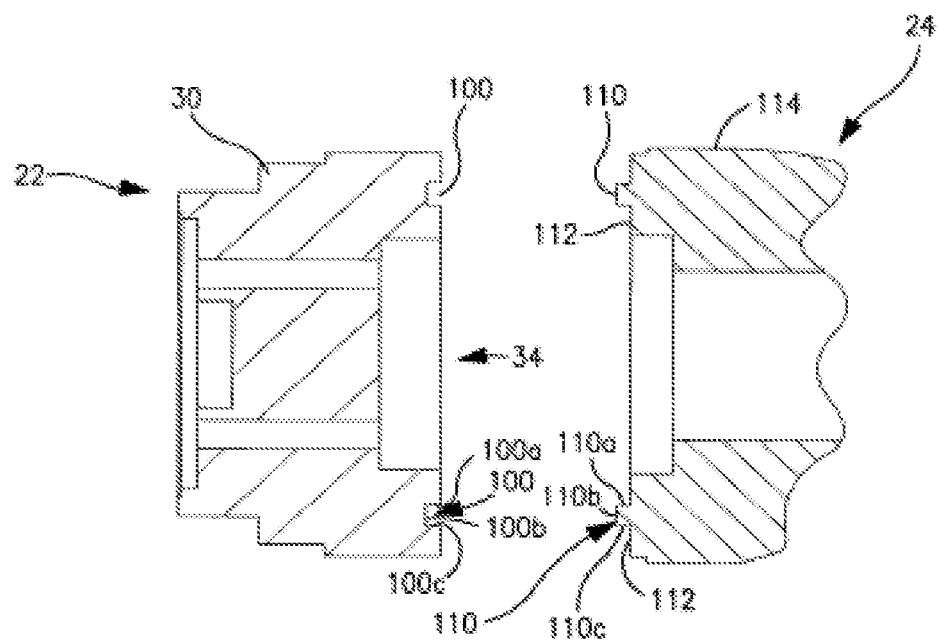
FIG. 4 is an exploded sectional view of the pressure sensor header and transducer and port of the pressure transducer assembly of FIG. 2.
Figure 5:
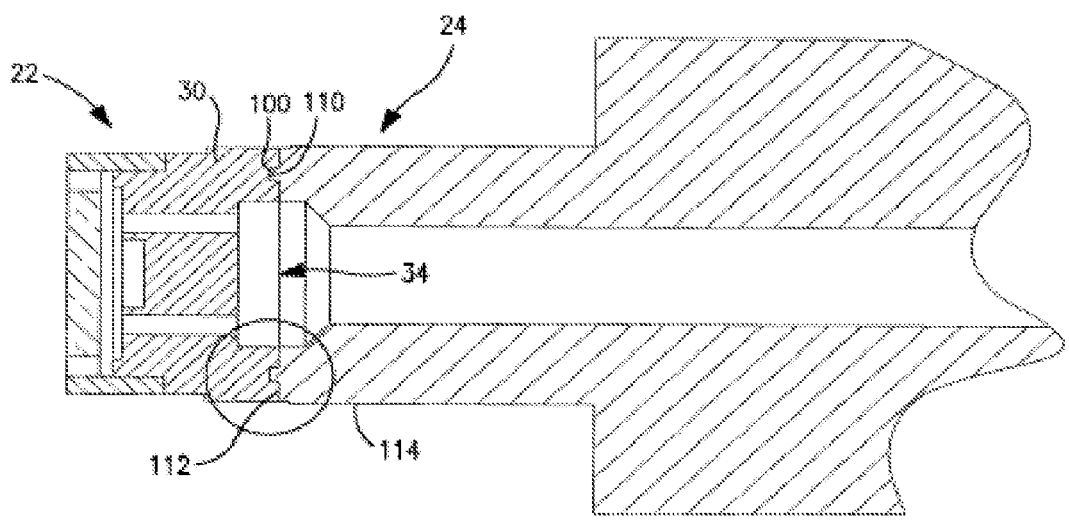
FIG. 5 is an enlarged sectional view of the pressure transducer assembly of FIG. 2.
Figure 6:
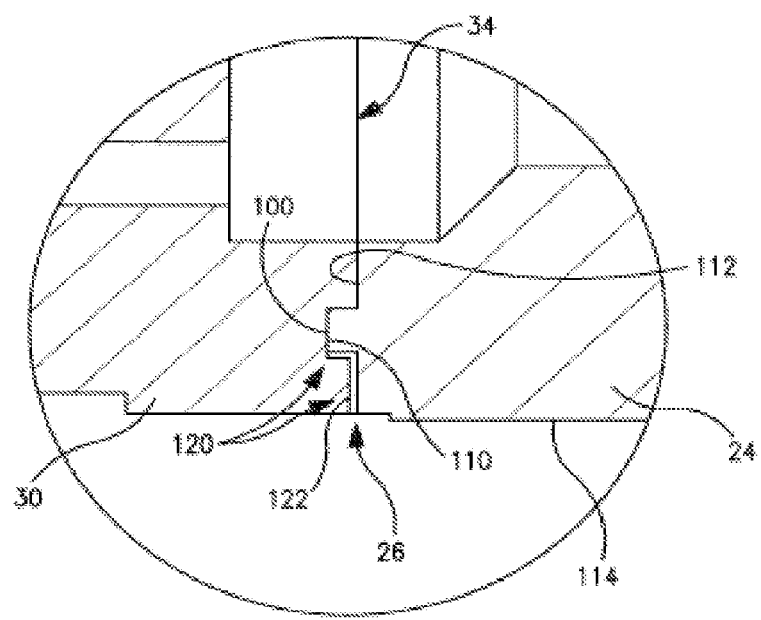
FIG. 6 is an enlarged view of the area circled in FIG. 5.

Referring now to FIGS. 4-6 collectively, there are shown a tongue and groove joining structure or arrangement according to an embodiment of the present invention, which is utilized at the header-port interface 26 for joining the header 22 to the port 24. In the shown embodiment, the tongue and groove joining arrangement includes a ring-shaped groove or recessed female element 100 formed in the back end 34 of the shell 30 of the header 22. The groove 100 is typically positioned concentrically with the side wall 36 of the shell 30. A mating or matching ring-shaped tongue or protruding male element 110 is formed on a rim surface 112 of the port 24. The tongue 110 is typically positioned concentrically with the outer side surface 114 of the port 24. It should be understood, that the tongue and groove joining arrangement may include a groove (not shown) formed in the rim surface 114 of the port 24 and a corresponding tongue (not shown) formed on the back end 34 of the shell 30 of the header 22.

The tongue 110 is formed to fit tightly (conventional slip-fit or press-fit) within the groove 100, upon assembly of the header 22 with the port 24, to create a weld area 120 at the header-port interface 26 suitable for being electron-beam welded, welded using another known welding method. The tongue 110 is typically configured to have a rectangular-shaped cross-section, such that the tongue 110 protrudes perpendicularly from the rim surface 112 of the port 24 and has three groove mating surfaces 110a, 110b, 110c, which are substantially orthogonal relative to each other. The matching groove 100 would then also be configured in a rectangular-shaped cross-section with three tongue mating surfaces 100a, 100b, 100c. The tongue and groove may be configured in other cross-sectional shapes, such as semicircular or triangular.

It is contemplated that he tongue and groove joining arrangement may also include two or more grooves or combination of groove(s) and tongue(s) formed in and/or on one of the back end 34 of the header shell 30 or rim surface 112 of the port 24 and a matching number of tongues or combination of tongues and grooves formed in and/or on the other one of the back end 34 of the header shell 30 or rim surface 112 of the port 24. Furthermore, the tongue and groove joining arrangement may be implemented with other male-female type joining configurations.

The tongue and groove joining arrangement of the present invention permits a full penetration weld 122 (to the tongue 110) to be made in weld area 120 as shown in FIG. 6. This weld extends through the header-port interface 26 to the mating surfaces 110c, 100c of the tongue 110 and groove 100. Hence, the tongue and groove joining arrangement increases the weld area, as compared with conventional butt welds or partial welds, thereby increasing the joint strength without the need for increasing the actual wall thickness of the transducer assembly 20.

Figure 7:
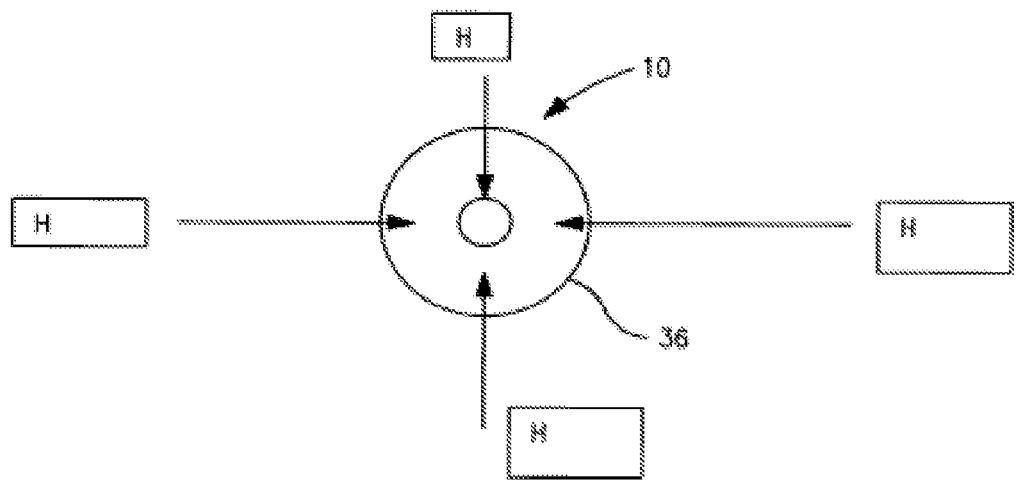
FIG. 7 is a schematic end view of a conventional pressure sensor header showing the application of hoop stress to the header shell.

As mentioned earlier, a pressure transducer assembly may receive very high hydrostatic pressures up to and over 50,000 psi, which act on the front face and side wall of the header. The pressure acting on the front face of the header tries to push the glass seals or pins into the header, which can break the glass-metal seals between the pins and the header shell, thereby allowing leakage of the pressure medium into the header, which destroys the header and sensor. The compressive or hoop stress generated by the pressure acting on the side wall of the header prevents the pins or glass seals from being pushed out of the header under the pressure applied to the header face. As shown in FIG. 7, the application of hydrostatic pressure to the side wall 14 of header 10 produces a hoop stress H that is exerted all around the side wall 36.

The compressive hoop stress H applies constrictive forces on the glass-metal seals, which strengthens the seals and overcomes the pressure acting on the front face, which is trying to push the seals into the header 10. In this manner, the extreme external pressures are converted to an advantageous hoop stress, which aids in preventing leakage resulting from the breakage of the glass-metal seals.

However, such high hoop stresses also tend to cause crack propagation in conventional butt or partially penetrated welds joining the header and the port together, which may result in weld fracture and fatigue failure. The tongue and groove arrangement of the invention substantially eliminates such problems by improving on the joint strength, as well as the strength of the overall pressure transducer assembly.

Figure 8:
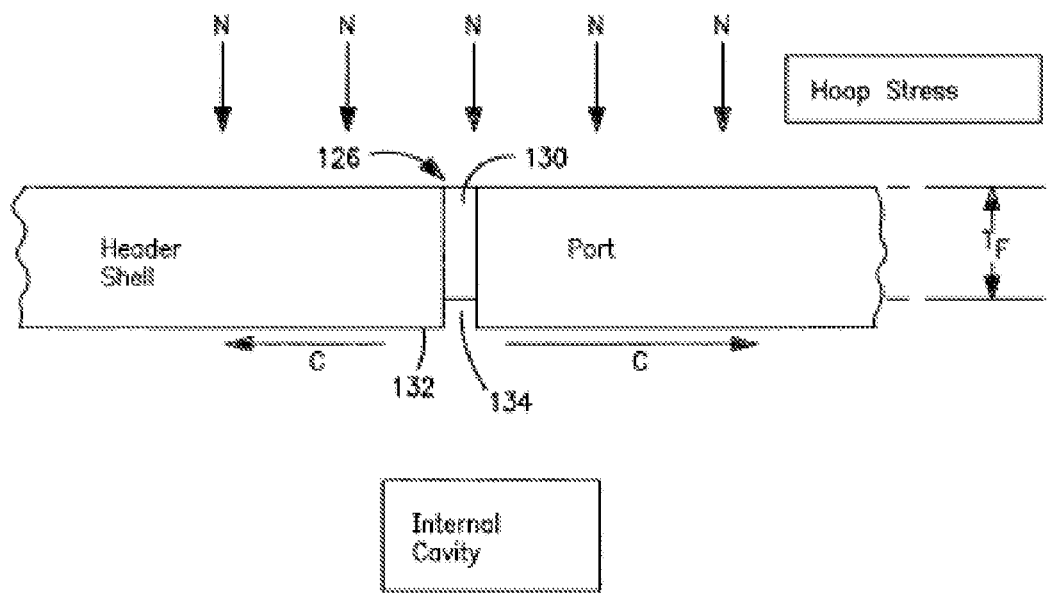
FIG. 8 is a sectional view of a portion of a conventional pressure transducer assembly showing how hoop stress causes crack propagation at the header-port interface.

Unlike conventional joining methods such as butt welds or partial penetration welds, the tongue and groove arrangement of the invention aids in preventing crack propagation under static or cyclic loading conditions. In the case of a conventional partial depth butt weld joining arrangement, as shown in FIG. 8 and denoted by numeral 130, cracks 134 (only one shown) in the weld 130 frequently occur along the inner circumference 132 of the header-port interface 126. The applied external (hydrostatic) pressure N generates opposing stress forces C, which operate to open the cracks 134. Under cyclic pressure conditions, this repeated force will continue to open the crack, with each cycle.

Figure 9:
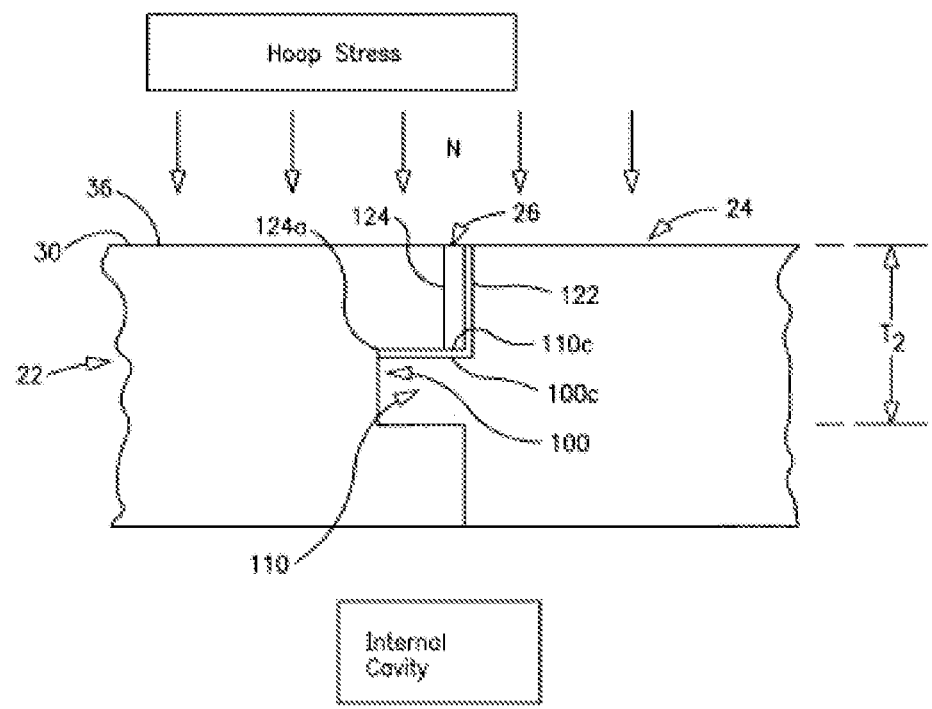
FIG. 9 is a sectional view of a pressure transducer assembly made with the tongue and groove joining arrangement of the present invention, showing how the joining arrangement takes advantage of hoop stress to stop crack propagation at the header-port interface.

As shown in FIG. 9, the tongue and groove joining arrangement of the present invention turns the direction of the cracks 124 (only one shown) 90 degrees so that the leading ends or crack tips 124a of the cracks 124 will be along the outer cylindrical surfaces 110c, 100c of the tongue and groove joining arrangement. The hoop stress resulting from the external pressure N places the leading ends 124a of the cracks 124 in compression, rather than in tension, therefore the cracks 124 will not continue to propagate. This application of compression rather than tension stress on the crack has an effect similar to that of drilling a hole at the tip of a crack, to reduce the stress concentration on the crack tip (the crack tip is where the stress is highest, and is the initiating point for opening the crack). Thus, the tongue and groove joining arrangement of the present invention improves on fatigue survival rates under cyclic pressure conditions, by preventing crack propagation in the weld joint area.

Another advantage of the tongue and groove joining arrangement of the present invention is that during the welding process, the tongue serves as a stop, thereby preventing the laser or electron beam or other welding medium from penetrating further into the joint. As can be seen in FIG. 8, the laser, electron beam or other welding medium may penetrate through the depth of the conventional partial depth butt weld 130, to the internal cavity or other parts of the header, such as the glass seals, pins, signal wires or other internal components, thereby damaging them. However, as can be seen in FIG. 9, the tongue 110 blocks or shields the laser, electron beam or other welding medium and thereby preventing the same from penetrating to the internal cavity or other parts of the header 22.

The tongue and groove joining arrangement of the present invention therefore eliminates the conventional problem of thermal stresses being applied to the header sealing glass or other components and stressing or cracking them. The tongue and groove feature avoids this problem without requiring the selection or designing of larger or longer headers. Thus, this arrangement avoids the problems associated with larger size headers such as higher cost, weight or decreased sensitivity.

A further advantage provided by the tongue and groove joining arrangement of the present invention is that the additional weld area provided by the tongue and groove may also add to the strength of the port by increasing the effective wall thickness. The stress on the port cylindrical wall is determined by the inside and outside diameters of the weld thickness, the difference of which is indicated as $T_1$ in FIG. 8, as well as by the pressures applied to the wall. However, to achieve a thicker wall in this conventional arrangement, a greater weld penetration may be required, causing potential heat stress to the internal components, as described above.

The tongue and groove joining arrangement of the present invention allows a thicker wall to be formed, without requiring such deeper weld penetration and consequential thermal effects. As can be seen in FIG. 9, the total wall thickness $T_2$ in this case is determined by the radial thickness of the weld penetration plus the radial thickness of the tongue element 110. In this manner, a thicker wall may be formed, without requiring higher heat to weld the complete depth of the wall. An equivalently thicker wall, and a stronger port, is achieved, without introducing damaging thermal effects to the internal cavity.

Thus, the present invention provides an improved method of joining the pressure header to an associated body section, such as a port. This arrangement allows the measurement of very high external pressures without encountering joint or component failures, while also eliminating the problem of header components being damaged by a deep welding process during fabrication. Additionally, the overall transducer unit is strengthened by the increased wall thickness permitted by the tongue and groove feature.

The foregoing description of the embodiments of this invention has been presented for purposes of illustration and description. It is not intended to be exhaustive or to limit the embodiments of the invention to the form disclosed, and, obviously, many modifications and variations are possible. Such modifications and variations that may be apparent to a person skilled in the art are intended to be included within the scope of this invention as defined by the accompanying claims.

The invention claimed is:
1. A pressure transducer assembly, comprising:
   a header assembly having a first outer surface and a first connection portion inset from the first outer surface;
   a port assembly having a second outer surface and a second connection portion inset from the second outer surface, wherein the first connection portion correspondingly mates with the second connection portion to create a header-port interface wherein the first outer surface and the second outer surface are substantially aligned; and a weld connection to secure the header assembly to the port assembly located adjacent the header-port interface.

2. The pressure transducer assembly of claim 1, wherein the mating of the first connection portion and the second connection portion applies a hoop stress around the first outer surface of the header assembly.

3. The pressure transducer assembly of claim 1, wherein the first connection portion and the second connection portion are corresponding tongue and groove configurations.

4. The pressure transducer assembly of claim 3, wherein the first connection portion comprises the tongue configuration.

5. The pressure transducer assembly of claim 3, wherein the second connection portion comprises the groove configuration.

6. The pressure transducer assembly of claim 1, wherein the weld connection is a full penetration weld.

7. The pressure transducer assembly of claim 6, wherein the full penetration weld extends radially inward and bonds the header assembly and the port assembly together.

8. The pressure transducer assembly of claim 1, wherein the header assembly comprises a sensing element.

9. The pressure transducer assembly of claim 8, wherein the sensing element is a pressure sensor.

10. A pressure transducer assembly, comprising:
a header assembly having an integral first connection portion;
a port assembly having an integral second connection portion, wherein the first connection portion correspondingly mates with the second connection portion to adjoin the header assembly and the port assembly to create a header-port interface;
wherein the first connection portion and the second connection portion are inset from an outer perimeter of the header-port interface; and
a weld connection to secure the header assembly to the port assembly located at the outer perimeter of the header-port interface.

11. The pressure transducer assembly of claim 10, wherein the mating of the first connection portion and the second connection portion applies a hoop stress around an outer wall of the header assembly.

12. The pressure transducer assembly of claim 10, wherein the first connection portion and the second connection portion are corresponding tongue and groove configurations.

13. The pressure transducer assembly of claim 12, wherein the first connection portion comprises the tongue configuration.

14. The pressure transducer assembly of claim 12, wherein the second connection portion comprises the groove configuration.

15. The pressure transducer assembly of claim 10, wherein the weld connection is a full penetration weld.

16. The pressure transducer assembly of claim 15, wherein the full penetration weld extends radially inward and bonds the header assembly and the port assembly together.

17. The pressure transducer assembly of claim 10, wherein the first connection portion and the second connection portion have mating circular cross-sections.

18. The pressure transducer assembly of claim 10, wherein the first connection portion and the second connection portion have mating rectangular cross-sections.

19. The pressure transducer assembly of claim 10, wherein the header assembly comprises a sensing element.

20. The pressure transducer assembly of claim 19, wherein the sensing element is a pressure sensor.

\* \* \* \* \*